United States Patent
Li et al.

(10) Patent No.: US 10,108,769 B1
(45) Date of Patent: Oct. 23, 2018

(54) DELAY MODELING FOR HIGH FAN-OUT NETS WITHIN CIRCUIT DESIGNS

(71) Applicant: Xilinx, Inc., San Jose, CA (US)

(72) Inventors: Yau-Tsun S. Li, Cupertino, CA (US); Grigor S. Gasparyan, San Jose, CA (US)

(73) Assignee: XILINX, INC., San Jose, CA (US)

( * ) Notice: Subject to any disclaimer, the term of this patent is extended or adjusted under 35 U.S.C. 154(b) by 80 days.

(21) Appl. No.: 15/295,911

(22) Filed: Oct. 17, 2016

(51) Int. Cl.
G06F 17/50 (2006.01)

(52) U.S. Cl.
CPC ........ G06F 17/505 (2013.01); G06F 17/5081 (2013.01)

(58) Field of Classification Search
USPC ........................................................ 716/104
See application file for complete search history.

(56) References Cited

U.S. PATENT DOCUMENTS

| | | |
|---|---|---|
| 5,907,248 A | 5/1999 | Bauer |
| 7,853,914 B1 | 12/2010 | Srinivasan |
| 2007/0150846 A1* | 6/2007 | Furnish ............... G06F 17/5068 716/122 |
| 2008/0216038 A1* | 9/2008 | Bose .................. G06F 17/5072 716/118 |
| 2009/0254874 A1* | 10/2009 | Bose .................. G06F 17/5068 716/113 |

* cited by examiner

*Primary Examiner* — Bryce Aisaka
(74) *Attorney, Agent, or Firm* — Kevin T. Cuenot

(57) ABSTRACT

Designing circuits can include, within a circuit design, detecting, using a processor, a high fan-out net having loads with a same timing requirement, wherein the circuit design is technology specific for a target integrated circuit (IC), determining, using the processor, a region having a predetermined shape and an area sized to fit loads of the high fan-out net within the region on the target IC, and determining, using the processor, a delay of the high fan-out net based upon a distance from a center of the region to an edge of the region. Designing circuits can also include assigning, using the processor, the delay to the high fan-out net.

20 Claims, 5 Drawing Sheets

500

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | 505 | | 505 | 505 | 505 | 505 | 505 | 505 | 505 | 505 | 505 | | 505 | 505 |
| 2 | 505 | | 505 | 505 | 505 | 505 | 505 | 505 | 505 | 505 | 505 | | 505 | 505 |
| 3 | 505 | 510 | 505 | 505 | 505 | 505 | 505 | 505 | 505 | 505 | 505 | 510 | 505 | 505 |
| 4 | 505 | | 505 | 505 | 505 | 505 | 505 | 505 | 505 | 505 | 505 | | 505 | 505 |
| 5 | 505 | | 505 | 505 | 505 | 505 | 505 | 505 | 505 | 505 | 505 | | 505 | 505 |
| 6 | 505 | | 505 | 505 | 505 | 505 | 505 | 505 | 505 | 505 | 505 | | 505 | 505 |
| 7 | 505 | | 505 | 505 | 505 | 505 | 505 | 505 | 505 | 505 | 505 | | 505 | 505 |
| 8 | 505 | 510 | 505 | 505 | 505 | 505 | 505 | 505 | 505 | 505 | 505 | 510 | 505 | 505 |
| 9 | 505 | | 505 | 505 | 505 | 505 | 505 | 505 | 505 | 505 | 505 | | 505 | 505 |
| 10 | 505 | | 505 | 505 | 505 | 505 | 505 | 505 | 505 | 505 | 505 | | 505 | 505 |
| 11 | 505 | | 505 | 505 | 505 | 505 | 505 | 505 | 505 | 505 | 505 | | 505 | 505 |
| 12 | 505 | | 505 | 505 | 505 | 505 | 505 | 505 | 505 | 505 | 505 | | 505 | 505 |
| 13 | 505 | 510 | 505 | 505 | 505 | 505 | 505 | 505 | 505 | 505 | 505 | 510 | 505 | 505 |
| 14 | 505 | | 505 | 505 | 505 | 505 | 505 | 505 | 505 | 505 | 505 | | 505 | 505 |
| 15 | 505 | | 505 | 505 | 505 | 505 | 505 | 505 | 505 | 505 | 505 | | 505 | 505 |

FIG. 5

DELAY MODELING FOR HIGH FAN-OUT NETS WITHIN CIRCUIT DESIGNS

FIELD OF THE INVENTION

This disclosure relates to integrated circuits (ICs) and, more particularly, to delay modeling for high fan-out nets within circuit designs.

BACKGROUND

Synthesis refers to the process of converting, or translating, an abstract, programmatic description of a circuit into a low-level design implementation. The abstract, programmatic description of the circuit describes behavior of the circuit and is also referred to as a "behavioral description" or a "register transfer level (RTL) description" of the circuit. The behavioral description is often specified using a hardware description language (HDL). The low-level design implementation generated through synthesis typically is specified as inter-connected logic gates.

High-level synthesis or "HLS" is an automated design process in which a description of desired behavior of a system is converted into a circuit design and/or digital circuitry. The description of the desired behavior is typically written as an application in a high level programming language such as C, C++, OpenCL™, and so forth. The application may be translated into a circuit design that may be specified as an RTL description. The RTL description describes a synchronous digital circuit in terms of the flow of digital signals between hardware registers and the operations performed on those signals. The RTL description may be further translated into a low-level design implementation.

A synthesized circuit design may be further processed through one or more additional phases of a design flow. Further, the processed circuit design may be implemented within an integrated circuit (IC). In a synthesized circuit design, many design tools utilize fixed delays to characterize the timing of nets of the circuit design since so little information about the ultimate physical implementation and/or architecture of the circuit design is known. In many cases, these delay estimates are overly optimistic. In consequence, the design tools often fail to place and route the circuit design meaning that the placed and/or routed circuit fails to meet established timing requirements for the circuit design and for the resulting physical circuit implementation within the target IC.

SUMMARY

An embodiment includes a method of designing circuits. The method can include, within a circuit design, detecting, using a processor, a high fan-out net having loads with a same timing requirement. The circuit design is technology specific for a target integrated circuit (IC). The method can include determining, using the processor, a region having a predetermined shape and an area sized to fit loads of the high fan-out net within the region on the target IC and determining, using the processor, a delay of the high fan-out net based upon a distance from a center of the region to an edge of the region. The method can also include assigning, using the processor, the delay to the high fan-out net.

Another embodiment includes a system for designing a circuit. The system includes a processor programmed to initiate executable operations. The executable operations include, within a circuit design, detecting a high fan-out net having loads with a same timing requirement, wherein the circuit design is technology specific for a target IC, determining a region having a predetermined shape and an area sized to fit loads of the high fan-out net within the region on the target IC, determining a delay of the high fan-out net based upon a distance from a center of the region to an edge of the region, and assigning the delay to the high fan-out net.

Another embodiment includes a computer program product. The computer program product includes a computer readable storage medium having program code stored thereon for designing a circuit. The program code is executable by a processor to perform operations including, within a circuit design, detecting a high fan-out net having loads with a same timing requirement, wherein the circuit design is technology specific for a target IC, determining a region having a predetermined shape and an area sized to fit loads of the high fan-out net within the region on the target IC, determining a delay of the high fan-out net based upon a distance from a center of the region to an edge of the region, and assigning the delay to the high fan-out net.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 5 is a block diagram illustrating another example architecture for an IC.

DETAILED DESCRIPTION OF THE DRAWINGS

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to delay modeling for high fan-out nets within circuit designs. One or more example embodiments described herein are capable of determining delays for nets of circuit designs with greater accuracy than is the case with other known techniques for determining delays. Many circuit design tools use a fixed delay for nets of a circuit design during or after performing synthesis. The circuit design tools presume the fixed delays based upon an assumption that the source and load(s) of a net will later be placed close together. Such is the case as there is little or no information available as to placement of the nets of the circuit design on the IC at the synthesis stage of a design flow for a circuit design. This presumption is inaccurate in many cases and may be especially inaccurate in the case of high fan-out nets.

In accordance with the example embodiments described herein, a system is capable of determining the area of a target IC that is needed to place a net. This area can accommodate the source and the loads of the net. From the determined area, the system is capable of determining the distance from the source to one or more loads. The distance may be used to determine a more accurate delay for the net. The area, distance, and delay calculations may be particularly accurate in the case of a programmable IC having a known circuit architecture with tiled circuit blocks. For purposes of discussion, the terms "tile," "programmable tile," "circuit block," and "programmable circuit block" are used interchangeably within this disclosure.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
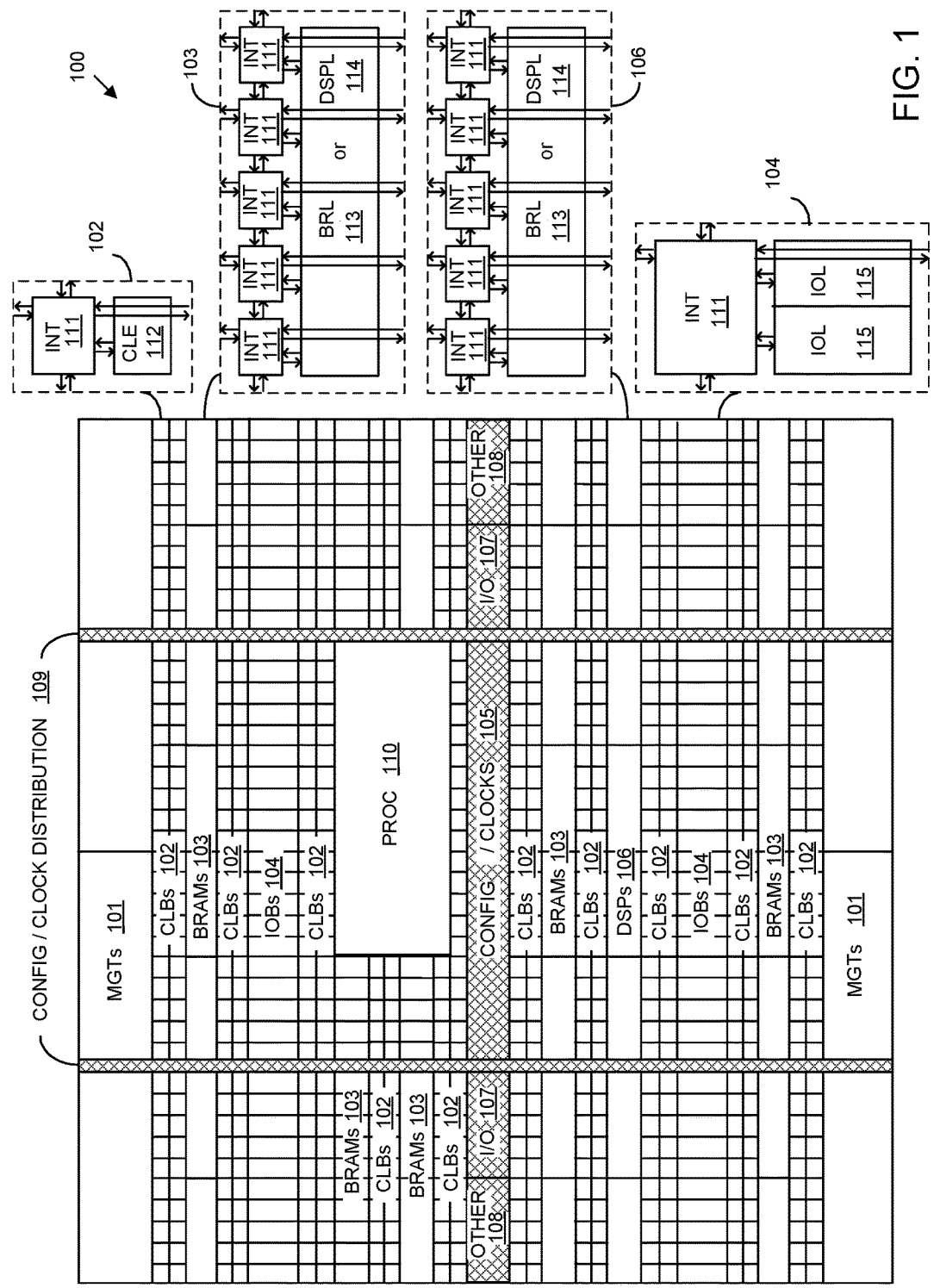
FIG. 1 is a block diagram illustrating an exemplary architecture for an integrated circuit (IC).

FIG. 1 is a block diagram illustrating an example architecture 100 for an IC. In one aspect, architecture 100 may be implemented within a programmable IC. For example, architecture 100 may be used to implement a field programmable gate array (FPGA). Architecture 100 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 100 includes several different types of programmable circuit, e.g., logic, blocks. For example, architecture 100 may include a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized I/O blocks 107 (e.g., configuration ports and clock ports), and other programmable logic 108 such as digital clock managers, analog-to-digital converters, system monitoring logic, and so forth.

In some ICs, each programmable tile includes a programmable interconnect element (INT) 111 having standardized connections to and from a corresponding INT 111 in each adjacent tile. Therefore, INTs 111, taken together, implement the programmable interconnect structure for the illustrated IC. Each INT 111 also includes the connections to and from the programmable logic element within the same tile, as shown by the examples included at the top of FIG. 1.

For example, a CLB 102 may include a configurable logic element (CLE) 112 that may be programmed to implement user logic plus a single INT 111. A BRAM 103 may include a BRAM logic element (BRL) 113 in addition to one or more INTs 111. Typically, the number of INTs 111 included in a tile depends on the height of the tile. As pictured, a BRAM tile has the same height as five CLBs, but other numbers (e.g., four) also may be used. A DSP tile 106 may include a DSP logic element (DSPL) 114 in addition to an appropriate number of INTs 111. An IOB 104 may include, for example, two instances of an I/O logic element (IOL) 115 in addition to one instance of an INT 111. The actual I/O pads connected to IOL 115 may not be confined to the area of IOL 115.

In the example pictured in FIG. 1, a columnar area near the center of the die, e.g., formed of regions 105, 107, and 108, may be used for configuration, clock, and other control logic. Horizontal areas 109 extending from this column may be used to distribute the clocks and configuration signals across the breadth of the programmable IC.

Some ICs utilizing the architecture illustrated in FIG. 1 include additional logic blocks that disrupt the regular columnar structure making up a large part of the IC. The additional logic blocks may be programmable blocks and/or dedicated circuitry. For example, a processor block depicted as PROC 110 spans several columns of CLBs and BRAMs.

In one aspect, PROC 110 may be implemented as dedicated circuitry, e.g., as a hardwired processor, that is fabricated as part of the die that implements the programmable circuitry of the IC. PROC 110 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 may be omitted from architecture 100 and replaced with one or more of the other varieties of the programmable blocks described. Further, such blocks may be utilized to form a "soft processor" in that the various blocks of programmable circuitry may be used to form a processor that can execute program code as is the case with PROC 110.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 1 that are external to PROC 110 such as CLBs 102 and BRAMs 103 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 110 or a soft processor. In some cases, architecture 100 includes a dedicated configuration processor that loads the configuration bitstream to the appropriate configuration memory and/or processor memory. The dedicated configuration processor does not execute user-specified program code. In other cases, architecture 100 may utilize PROC 110 to receive the configuration bitstream, load the configuration bitstream into appropriate configuration memory, and/or extract program code for execution.

FIG. 1 is intended to illustrate an exemplary architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 110 within the IC are for purposes of illustration only and are not intended as limitations.

In the case circuit designs intended to be implemented within a programmable IC, e.g., one having an architecture the same as or similar to that of architecture 100 of FIG. 1, high fan-out nets are common. In some cases, the high fan-out nets may include data signals, e.g., only data signals. In other cases, the high fan-out nets may include clock signals, e.g., only clock signals. A net of clock enable signals is one example of a high fan-out net often found within circuit designs for implementation within programmable ICs. A net of clock reset signals is another example of a high fan-out net often found within circuit designs for implementation within programmable ICs.

FIG. 1 also illustrates several traits that characterize many programmable ICs. One trait is that is that some circuit blocks such as DSPs and/or BRAMs are located in columns. In some cases, columns of one type of circuit block such as CLBs may be located between two or more columns of other circuit blocks such as columns of DSPs and/or BRAMs. The DSPs and/or BRAMs, for example, are spread out on the target IC. As such, conventional techniques for estimating delay that utilize fixed delays predicated on the assumption that load circuit blocks of a net will be close together and/or close to the source are often inaccurate. Another aspect of architecture 100 is that delays of signals are generally proportional to distance on the target IC. This is due, at least in part, to the tiled circuit structure of the IC. As such, the delay of a net is generally proportional to the distance between the source of the net and the load of the net.

Figure 2:
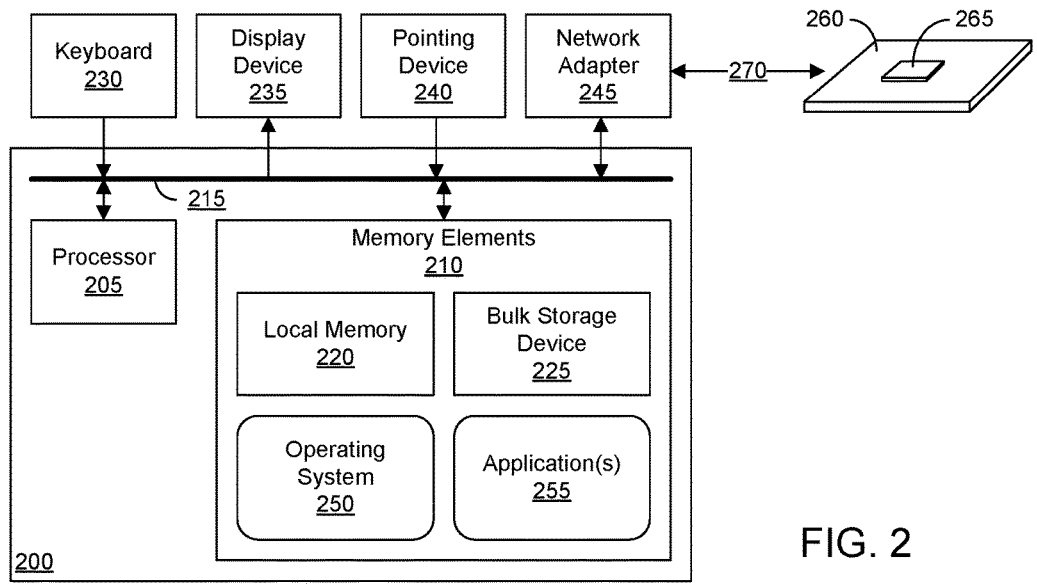
FIG. 2 is a block diagram illustrating an example data processing system.

FIG. 2 is a block diagram illustrating an example data processing system (system) 200. As pictured, system 200 includes at least one processor 205 coupled to memory elements 210 through a system bus 215 or other suitable circuitry such as an input/output (I/O) subsystem. System 200 stores computer readable instructions (also referred to as "program code") within memory elements 210. Memory elements 210 may be considered an example of computer readable storage media. Processor 205 executes the program code accessed from memory elements 210 via system bus 215.

Memory elements 210 include one or more physical memory devices such as, for example, a local memory 220 and one or more bulk storage devices 225. Local memory 220 refers to random access memory (RAM) or other non-persistent memory device(s) generally used during actual execution of the program code. Bulk storage device 225 may be implemented as a hard disk drive (HDD), solid state drive (SSD), or other persistent data storage device. System 200 may also include one or more cache memories (not shown) that provide temporary storage of at least some program code in order to reduce the number of times program code must be retrieved from bulk storage device 225 during execution.

System 200 may be coupled to one or more I/O devices such as a keyboard 230, a display device 235, a pointing device 240, and/or one or more network adapters 245. System 200 may include one or more additional I/O device(s) beyond the examples provided. The I/O devices described herein may be coupled to system 200 either directly or through intervening I/O controllers. In some cases, one or more of the I/O device(s) may be combined as in the case where a touch sensitive display device 235 (e.g., a touchscreen) is used. In that case, display device 235 may also implement keyboard 230 and/or pointing device 240.

Network adapter 245 is a communication circuit configured to establish wired and/or wireless communication links with other devices. The communication links may be established over a network or as peer-to-peer communication links. Accordingly, network adapter 245 enables system 200 to become coupled to other systems, computer systems, remote printers, and/or remote storage devices. Example network adapter(s) 245 may include, but are not limited to, modems, cable modems, Ethernet cards, bus adapters, connectors, and so forth. Network adapter 245 may be a wireless transceiver, whether a short and/or a long range wireless transceiver.

As pictured, memory elements 210 may store an operating system 250 and one or more application(s) 255. Application 255, for example, may be an electronic design automation (EDA) application. In one aspect, operating system 250 and application(s) 255, being implemented in the form of executable program code, are executed by system 200 and, more particularly, by processor 205, to perform the various operations described within this disclosure. As such, operating system 250 and application 255 may be considered an integrated part of system 200. Operating system 250, application 255, and any data items used, generated, and/or operated upon by system 200 such as circuit designs whether expressed as register transfer level descriptions, a configuration bitstream, or another format are functional data structures that impart functionality when employed as part of system 200 or are provided to a target IC for implementation therein in a suitable format.

As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

System 200 may include fewer components than shown or additional components not illustrated in FIG. 2 depending upon the particular type of device that is implemented. In addition, the particular operating system and/or application(s) included may also vary according to device type as may the types of network adapter(s) included. Further, one or more of the illustrative components may be incorporated into, or otherwise form a portion of, another component. For example, a processor may include at least some memory.

In another arrangement, system 200 may be coupled to a platform 260 through a communication link 270. In one example, system 200 may be coupled to platform 260 through network adapter 245. In another example, system 200 may include one or more other I/O devices such as Universal Serial Bus (USB) interface, or other communication port that may be used to couple system 200 to platform 260.

Platform 260 may be a circuit board or card and have target hardware such as a target IC 265 coupled thereto. In one arrangement, target IC 265 may be implemented as a programmable IC such as an FPGA or an application specific integrated circuit (ASIC). System 200 may be configured to provide or download a circuit design, e.g., a configuration bitstream specifying the circuit design, to target IC 265. With the circuit design loaded into target IC 265, the circuit design is physically implemented within target IC 265.

Figure 3:
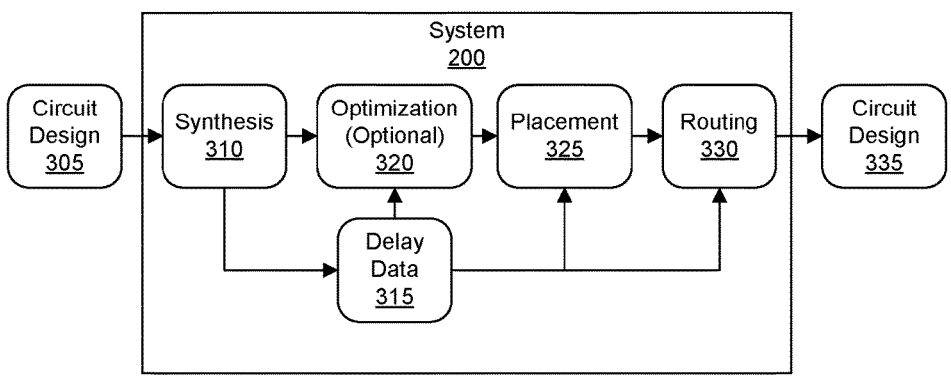
FIG. 3 illustrates example processing performed by the system of FIG. 2 upon a circuit design.

FIG. 3 illustrates example processing performed by system 200 upon a circuit design 305. For purposes of illustration, system 200 is illustrated performing one or more operations and generating example data structures. As pictured in FIG. 3, system 200 may receive a circuit design 305.

In one embodiment, system 200 performs synthesis 310 on circuit design 305. In one aspect, synthesis 310 converts an abstract, programmatic description of a circuit, e.g., circuit design 305, into a low-level design implementation. In another aspect, synthesis 310 converts a description specified in a high level programming language into a low level design implementation. Synthesis 310 may also include mapping. Mapping is the process of correlating, or matching, the logic gates of the low-level circuit design implementation to the various types of physical circuit blocks that are actually available in the particular IC in which the circuit design is to be implemented, i.e., the "target IC." For example, since a lookup table (LUT) may implement a complex function, one or more logic gates of the low-level design implementation may be mapped to a single LUT, or other programmable tile of the target IC. The mapped circuit design specifies the same functionality as the low-level design implementation, albeit in terms of the particular circuit blocks available on the target IC as opposed to low-level logic gates. The resulting circuit design post synthesis 310, is a technology specific implementation of the circuit design intended for implementation on a particular (e.g., target) IC.

In one embodiment, as part of synthesis 310 or following synthesis 310, system 200 is capable of analyzing the technology specific version of circuit design 305 to detect one or more high fan-out nets included therein. Further, system 200 is capable of detecting only those high fan-out nets that have a same timing criticality, or same timing requirement, for each load of the net. For example, some loads such as a LUT, which is a combinatorial circuit element, may implement different levels of logic and, as such, have different criticality or different timing requirements for the same LUT. A net with such loads would not quality as a high fan-out net for purposes of this disclosure.

As used herein, the term "high fan-out net" means a net of a circuit design or circuit that has a source (e.g., a circuit element or pin) that drives a number of loads (circuit elements or pins), where the number of loads exceeds a minimum threshold number of loads. In one aspect, the high fan-out net may include only source(s) that convey data signals to loads. In another aspect, the high fan-out net may include only source(s) that convey clock signals to loads. In one example, a high fan-out net may include only source(s) that convey clock enable signals to loads. In another example, a high fan-out net may include only source(s) that convey clock reset signals to loads.

In one embodiment, the minimum threshold number of loads may be specified as an adjustable preference within system 200. The minimum threshold number of loads may be increased or decreased as a system preference to facilitate improved performed by system 200. In one example, the minimum threshold number of loads is 1,000. In another example, the minimum threshold number of loads is 500. Other example values for the minimum threshold number of loads include 250, 2,000, 3,000, and so forth. The values provided herein are provided for purposes of illustration only and, as such, are not intended to limit the scope of the embodiments described herein.

System 200 is capable of determining a region having an area large enough to place loads of the high fan-out net on a target IC. The target IC may be a programmable IC as generally described within this disclosure. In determining the region and area needed to place, or fit, the loads of the high fan-out net, system 200 is capable of using a particular or predefined shape with the source of the net being located at a center, or substantially at the center, of the area and/or shape.

System 200 is further capable of determining delays to the loads of the high fan-out net based upon distance between the source and the load(s) where the delay, as noted, is considered proportional to the distance between source and load(s). The delays generated are illustrated in FIG. 3 as delay data 315. In one aspect, the load used for determining distance may be a load that is located at a particular location of the region and/or shape such as a corner, an edge, or other feature. In one example, system 200 is capable of selecting a load located the farthest distance from the source while still within the region on the target IC. Due to the known circuit architecture of the target IC, system 200 may estimate delay data 315 for the selected load based upon the distance. In one aspect, system 200 uses the estimated delay for each load of the high fan-out net.

System 200 is capable of performing one or more optional optimization operations 320 on circuit design 305 using delay data 315. For example, system 200 is capable of performing optimizations such as replication, reducing logic depth, retiming, and so forth, to break down high fan-out nets. The particular operations 320 performed result in a different structure, but functionally equivalent version, of the circuit design than had system 200 used overly optimistic and fixed delays. By utilizing more accurate delays (delay data 315) for nets as described herein, system 200 is able to apply the one or more optimizations 320 (including any others known to the skilled artisan that may be performed by an EDA tool) to the technology specific version of circuit design 305. Were other more optimistic delays used, system 200 would presume the high fan-out nets meet timing, not apply optimizations, and not attempt to break up the high fan-out nets. Further, other operations such as placement and/or routing would fail to determine a placement and/or routing that meets the established timing requirements for the circuit design.

System 200 further can perform additional operations as part of a design flow such as placement 325, routing 330, and/or configuration bitstream generation (not shown). In one embodiment, in performing placement 325 and/or routing 330, system 200 continues to utilize delay data 315. Delay data 315 is more accurate than using the fixed delays assumed by other EDA tools. In another embodiment, as circuit design 305 continues through the implementation flow shown, delay data 315 may be updated with increasingly accurate delay information as more information about the location of circuit elements on the target IC and routing of circuit design 305 is determined.

Placement is the process of assigning elements of the synthesized circuit design to particular instances of circuit blocks and/or resources having specific locations on the target IC. Once placed, a circuit element of the circuit design has a specific location on the target IC as opposed to only being assigned to a particular type of circuit block and/or resource as is the case after mapping and prior to placement. The location of a circuit element of a circuit design, once placed, is the location on the target IC of the instance of the circuit block and/or resource to which the circuit element is assigned. Routing is the process of selecting particular routing resources such as wires, PIPs, PIP settings, and/or other interconnect circuitry to electrically couple the various circuit blocks of the target IC after placement.

System 200 generates circuit design 335. Circuit design 335 may be a placed and routed version of circuit design 305. While circuit design 335 is functionally equivalent to circuit design 305 and any of the intermediate versions of circuit design 305 that may be generated by system 200 in operating on circuit design 305, it should be appreciated that accurate delay data 315 determined as described herein results in a different physical architecture to circuit design 335 and different physical implementation of circuit design 335 when implemented within a target IC such as IC 265 than had the fixed delays been used.

Figure 4:
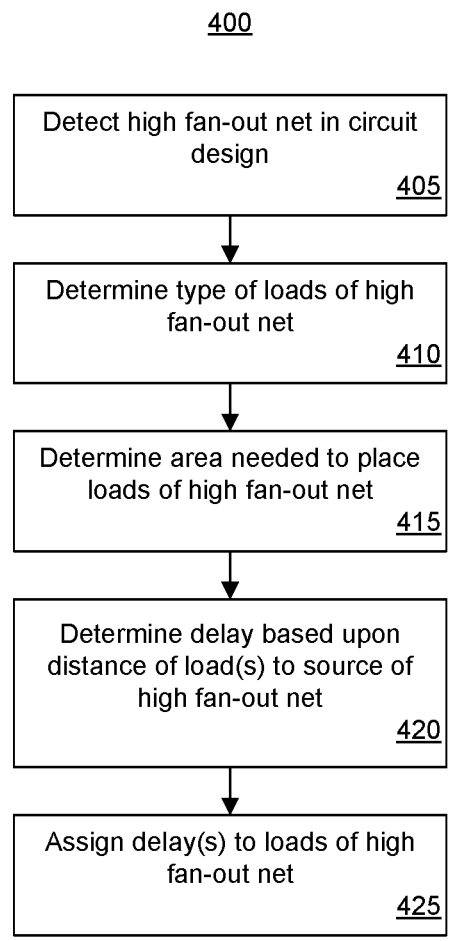
FIG. 4 illustrates an example method of determining delays for nets of a circuit design.

FIG. 4 illustrates an example method 400 of determining delays for nets of a circuit design. Method 400 may be performed by a system such as system 200 of FIG. 2. Method 400 may begin in a state where the system has loaded or access to a technology specific circuit design. For example, the circuit design being operated upon by the system may be one that has been synthesized (e.g., including mapping).

In block 405, the system detects a high fan-out net within the circuit design. In one aspect, the high fan-out net is one with a number of loads that exceeds the minimum threshold number of loads. Further, the loads of the net have a same timing requirement. As noted, the net may include data signals or clock signals. In one embodiment, each load of the net may be a clock enable pin of a circuit block. In another embodiment, each load of the net may be a clock reset pin of a circuit block.

In block 410, the system determines the type of the loads of the high fan-out net. Each load may be a particular type of circuit block of the target IC. Each type of circuit block has a predetermined size. For example, a CLB, as described with reference to FIG. 1 may have a width of one tile and a height of one tile. Other circuit blocks, depending upon the type, may have different widths and heights. The size of circuit blocks is described in greater detail below.

In block 415, the system determines the area needed to place the loads of the high fan-out net. For example, the system, having identified a high fan-out net, knows the number of loads of the high fan-out net and the type (and thus size) of each load of the high fan-out net. As such, the system is capable of determining the area needed to place the loads of the high fan-out net. In another example, the area is the minimum area needed to place the loads of the high fan-out net.

In one embodiment, the system is capable of determining the area of the target IC that will be needed to place the high fan-out net by constraining the source and loads of the high fan-out net to a region having a predetermined geometric shape or type of geometric shape. Example shapes for the region that is to include the loads of the high fan-out net may include, but are not limited to, rhombus, a square (e.g., rotated such as a diamond shape), and so forth.

In another embodiment, the size of the loads is also determined based upon spacing between like, or same, types of loads on the target IC. As an example, in the case where a circuit block that is a load of the high fan-out net is located only every other column of circuit blocks as opposed to within each column of circuit blocks, such a circuit block may be said to have a width of 2 tiles. The relationship between size of loads and spacing on the target IC is illustrated in greater detail below with reference to FIGS. 5 and 6.

Referring again to block 415, the system determines the number of loads N of the high fan-out net (e.g., N different loads or load instances). Each load, presuming loads of a same type or circuit block type, has a width of W tiles and a height of H tiles. As such, the area of each load is given by the expression $A_{Tile}=WH$. The total area $A_{Net}$ needed to place the high fan-out net is the area of the load times the number of loads of the high fan-out net given by the expression $A_{Net}=NWH$.

As discussed, the loads of the high fan-out net have the same timing criticality (e.g., delay requirement). The driver of the high fan-out net is located, or presumed to be located, at the center of the region. For purposes of illustration, consider an example with a rhombus shaped region. The vertical distance from the source to a load located at a top (or bottom) corner is denoted as $R_v$. The horizontal distance from the source to a load located at a corner to the right (or left) is denoted as $R_h$. $R_v$ is one half of the (e.g., vertical) diagonal of the rhombus, while and $R_h$ is one half of the (e.g., horizontal) diagonal of the rhombus. The area $A_{region}$ of the shape is given by the expression $A_{region}=2R_vR_h$.

In block 420, the system determines the delay(s) based upon the distance between the source and the load(s) of the high fan-out net. In the case of a target IC, e.g., an FPGA, with a known architecture, the delays are generally proportional to distance. In one example, the system measures the distance from a center of the region to an edge of the region. For example, the source may be located, or presumed to be located, at the center of the region and a load may be located or presumed to be located at the edge of the region. The edge may be the farthest edge, or load, from the center or source.

In another example, the distance may be from the center or source to a corner of the region or a load at the corner of the region. For example, the particular load used may be one that is located the farthest distance on the target IC from the source, e.g., center of the region, while still being located within the region.

The distances may be used to derive delays where $S_v$ is the vertical delay per tile of the target IC and $S_h$ is the horizontal delay per tile of the target IC. In one embodiment, the delay from the source to each corner of the region is the same, e.g., $S_v R_v = S_h R_h$. In the case where $S_v = S_h$, then $R_v = R_h$, and the rhombus will be diamond shaped (e.g., a square rotated 45 degrees). In the case where $S_v \neq S_h$, then then $R_v \neq R_h$ and the rhombus will be skewed either vertically or horizontally. In any case, the estimated delay may be determined starting with the expression as shown below:

$$2R_v R_h = NHW \quad (1)$$

Since $S_v R_v = S_h R_h$, it can be seen that substituting $$R_h = \frac{S_v}{S_h} R_v$$

into expression (1) results in expression 2 below.

$$2(S_v/S_h)R_v^2 = NHW \quad (2)$$

Solving for $R_v$ in expression (2) results in expression (3) below.

$$R_v = \sqrt{(S_h/S_v)NHW/2} \quad (3)$$

Accordingly, the system estimates the delay using expression (4) below:

$$S_v R_v = S_h R_h = \text{Delay} = \sqrt{S_v S_h NHW/2}. \quad (4)$$

Within the above expressions, the values for $S_v$ and $S_h$ are constants that are programmed into the system.

In block 425, the system assigns the delay(s) to the loads of the high fan-out net or to the high fan-out net. Following block 425, the system may optionally perform one or more operations using the delays determined in FIG. 4, optionally perform placement using the delays determined in FIG. 4, and/or optionally perform routing using the delays determined in FIG. 4. The resulting circuit design may be implemented within the target IC.

In another embodiment, the system is capable of determining a high fan-out net that has loads of more than one type so long as the loads have same timing requirements. In that case, the system may determine an area needed to place loads of the high fan-out net for each different type of load. For example, the system may determine one region (e.g., a rhombus shaped region) for loads of each different type independently. In one embodiment, these regions overlap each other. Accordingly, the system is capable of determining the size of each region on a per load type basis, and thus, the delay for each different load type based upon the determined region for that load type. As such, the system may determine more than one delay for the high fan-out net where the system determines one delay for each different load type of the high fan-out net.

FIG. 5 is a block diagram illustrating another example architecture 500 for an IC. Architecture 500 may be for a programmable IC such as an FGPA. Architecture 500 is a simplified example provided to illustrate how circuit blocks, e.g., loads, of a high fan-out net may be sized. Architecture 500 may include additional circuit blocks, fewer circuit blocks, additional circuit blocks of different types, and/or a varied arrangement of circuit blocks. As such, architecture 500 is not intended as a limitation of the example embodiments described herein.

As pictured, architecture 500 includes a plurality of columns 1-14 and rows 1-15 of circuit blocks 505 and 510. For purposes of illustration, circuit blocks 510 may be considered to have a width of one tile and a height of one tile. As shown, circuit blocks 510 are the same width as circuit blocks 505, but are 5 times as tall as circuit block 505. Circuit blocks 510 have an actual width of one tile and an actual height of 5 tiles.

As discussed, for purposes of determining delays, the size of the loads may be determined based upon a spacing between like loads of a same type on the target IC. As shown, circuit blocks 510 are spaced 10 columns apart. In order to account for spacing, the width of circuit blocks 510 is adjusted, for purposes of estimating delay, from 1 tile to 10 tiles. The adjustment may be made for both width and height, if applicable.

The size of circuit blocks may also be adjusted according to capacity. For example, in the case where circuit blocks 510 are DSPs, each DSP (or DSP block) may include more than one site. For purposes of illustration, a DSP includes 2 sites. This means that the height of a DSP would be adjusted from 5 tiles to 5/2 tiles. Similarly, the width of the DSP would be adjusted from 10 to 10/2 (e.g., 5). In another example, circuit blocks 510 are BRAMs. Still, similar processing may be performed where width and height are adjusted according to spacing and capacity (e.g., number of sites in the block).

Figure 6:
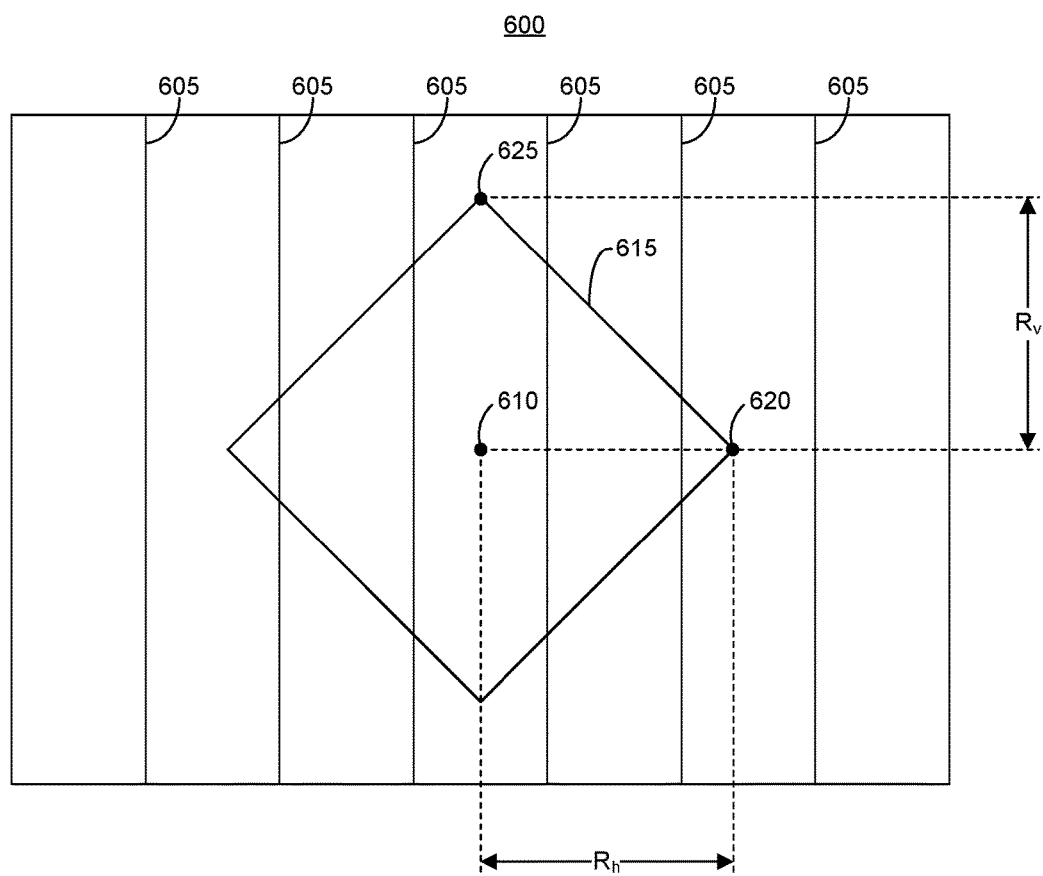
FIG. 6 illustrates an example of delay modeling for a high fan-out net of a target IC.

FIG. 6 illustrates an example of delay modeling for a high fan-out net of a target IC 600. Target IC 600 may be a programmable IC. For example, target IC 600 may be an FPGA. In the example of FIG. 6, the vertical lines 605 represent a column of DSP blocks. Each of the DSP blocks may include 2 DSP sites and have an actual height of 5 tiles, which, as noted, results in an adjusted height of 5/2 tiles. Columns 605 are spaced 10 tiles apart. Accordingly, the width of a DSP block is adjusted from 1 tile to 10/2 tiles (dividing by 2 due to the DSP block having 2 DSP sites).

The system is programmed with delay times on a per tile or circuit block basis in the horizontal and vertical directions. For purposes of illustration, the system is programmed with a vertical delay ($S_v$) of approximately 11.4 picoseconds per tile and a horizontal delay ($S_h$) of approximately 24.2 picoseconds per tile.

For purposes of illustration and with reference to FIG. 6, consider an example where the system detects a high fan-out net having 1,000 DSP block loads, where each load has a same timing criticality. For example, each of the 1,000 DSP loads may have a clock enable pin that is a load of a source of the high fan-out net or a clock reset pin that is a load of a source of the high fan-out net. Within FIG. 6, region 615 is diamond shaped and has an area that can include N DSP blocks or loads of the high fan-out net. Region 615 further has the minimum area needed to fit the 1,000 DSP block loads. Region 615 has an area of NWH.

Region 615 has a center 610 where the source of the high fan-out net is presumed to be located. In the example of FIG. 6, the distance $R_h$ is ½ of the vertical diagonal of region 615. $R_h$ is the distance from center 610 to point 620. The distance $R_v$ is ½ of the horizontal diagonal of region 615. $R_v$ is the distance from center 610 to point 625.

Using the above expression of Delay=$\sqrt{S_v S_h NHW/2}$, with the values N=1000, $S_v$=11.4, $S_h$=24.2, H=5/2, and W=10/2, the delay for the net, e.g., each load of the net, is determined to be 1,857 picoseconds. This example illustrates that the distance of $R_v$ is 162 tiles while the distance of $R_h$ is 78 tiles. These distances are much larger than the fixed distances utilized in other conventional delay estimation techniques. For example, some conventional systems, as noted, estimate delay to be 150 picoseconds, which is overly optimistic.

Those skilled in the art will recognize that while region 615 is shown as a rotated square, a scaled representation of region 615 is elongated in the vertical direction.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system. As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. As defined herein, the term "output" means storing in physical memory elements, e.g., devices, writing to display or other peripheral output device, sending or transmitting to another system, exporting, or the like. As defined herein, the term "plurality" means two or more than two.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, a graphics processing unit (GPU), a controller, and so forth.

As defined herein, the term "real time" means a level of processing responsiveness that a user or system senses as sufficiently immediate for a particular process or determination to be made, or that enables the processor to keep up with some external process. As defined herein, the term "user" means a human being. The terms first, second, etc. may be used herein to describe various elements. These elements should not be limited by these terms, as these terms are only used to distinguish one element from another unless stated otherwise or the context clearly indicates otherwise.

In some instances, the term "signal" may be used within this disclosure to describe physical structures such as terminals, pins, signal lines, wires. The term "signal" may refer to the conveyance of a single bit, e.g., a single wire, or the conveyance of multiple parallel bits through multiple parallel wires. Further, each signal may represent bi-directional communication between two, or more, components connected by the signal.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method of designing circuits can include, within a circuit design, detecting, using a processor, a high fan-out net having loads with a same timing requirement, wherein the circuit design is technology specific for a target IC. The method can include determining, using the processor, a region having a predetermined shape and an area sized to fit loads of the high fan-out net within the region on the target integrated circuit, determining, using the processor, a delay of the high fan-out net based upon a distance from a center of the region to an edge of the region, and assigning, using the processor, the delay to the high fan-out net.

In one aspect, the area can be a minimum area needed to place the loads of the high fan-out net.

In another aspect, the predetermined shape can be a rhombus and the edge can be a farthest edge from the center.

In another aspect, the area can be determined according to a number of the loads of the high fan-out net and a size of the loads.

In yet another aspect, the size of the loads can be determined based upon a spacing between like loads of a same type on the target IC.

In still another aspect, the high fan-out net includes a plurality of different types of loads. In that case, the method can include determining a region for each type of load of the high fan-out net and area for each region and determining a delay of the high fan-out net for each type of load based upon a distance from a center of the region for the load type to an edge of the region for the load type.

In a further aspect, a pin for each load is a clock enable pin or a clock reset pin.

A system for designing a circuit can include a processor configured to initiate executable operations. The executable operations can include, within a circuit design, detecting a high fan-out net having loads with a same timing requirement, wherein the circuit design is technology specific for a target integrated circuit. The executable operations can include determining a region having a predetermined shape and an area sized to fit loads of the high fan-out net within the region on the target integrated circuit, determining a delay of the high fan-out net based upon a distance from a center of the region to an edge of the region, and assigning the delay to the high fan-out net.

In one aspect, the area can be a minimum area needed to place the loads of the high fan-out net.

In another aspect, the predetermined shape can be a rhombus and the edge can be a farthest edge from the center.

In another aspect, the area can be determined according to a number of the loads of the high fan-out net and a size of the loads.

In yet another aspect, the size of the loads can be determined based upon a spacing between like loads of a same type on the target IC.

In still another aspect, the high fan-out net includes a plurality of different types of loads. In that case, the executable operations can include determining a region for each type of load of the high fan-out net and area for each region and determining a delay of the high fan-out net for each type of load based upon a distance from a center of the region for the load type to an edge of the region for the load type.

In a further aspect, a pin for each load is a clock enable pin or a clock reset pin.

A computer program product can include a computer readable storage medium having program code stored thereon for designing a circuit. The program code can be executable by a processor to perform operations. The operations can include, within a circuit design, detecting a high fan-out net having loads with a same timing requirement, wherein the circuit design is technology specific for a target integrated circuit. The operations can include determining a region having a predetermined shape and an area sized to fit loads of the high fan-out net within the region on the target integrated circuit, determining a delay of the high fan-out net based upon a distance from a center of the region to an edge of the region, and assigning the delay to the high fan-out net.

In one aspect, the area can be a minimum area needed to place the loads of the high fan-out net.

In another aspect, the predetermined shape can be a rhombus and the edge can be a farthest edge from the center.

In another aspect, the area can be determined according to a number of the loads of the high fan-out net and a size of the loads.

In yet another aspect, the size of the loads can be determined based upon a spacing between like loads of a same type on the target IC.

In still another aspect, the high fan-out net includes a plurality of different types of loads. In that case, the operations can include determining a region for each type of load of the high fan-out net and area for each region and determining a delay of the high fan-out net for each type of load based upon a distance from a center of the region for the load type to an edge of the region for the load type.

In a further aspect, a pin for each load is a clock enable pin or a clock reset pin.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of designing circuits, comprising:
    within a circuit design, detecting, using a processor, a high fan-out net having loads with a same timing requirement, wherein the circuit design is technology specific for a target integrated circuit;
    determining, using the processor, a region having a predetermined shape and an area sized to fit loads of the high fan-out net within the region on the target integrated circuit;
    determining, using the processor, a delay of the high fan-out net based upon a distance from a center of the region to an edge of the region; and
    performing at least one of placement or routing, by the processor, using the delay of the high fan-out net for hardware implementation within the target integrated circuit.

2. The method of claim 1, wherein the area is a minimum area needed to place the loads of the high fan-out net.

3. The method of claim 1, wherein the predetermined shape is a rhombus and the edge is a farthest edge from the center.

4. The method of claim 1, wherein the area is determined according to a number of the loads of the high fan-out net and a size of the loads.

5. The method of claim 4, wherein the size of the loads is determined based upon a spacing between like loads of a same type on the target integrated circuit.

6. The method of claim 1, wherein the high fan-out net comprises a plurality of different types of loads, the method further comprising:
    determining a region for each type of load of the high fan-out net and area for each region; and
    determining a delay of the high fan-out net for each type of load based upon a distance from a center of the region for the load type to an edge of the region for the load type.

7. The method of claim 1, wherein a pin for each load is a clock enable pin or a clock reset pin.

8. A system for designing a circuit, comprising:
    a processor configured to initiate executable operations including:
    within a circuit design, detecting a high fan-out net having loads with a same timing requirement, wherein the circuit design is technology specific for a target integrated circuit;
    determining a region having a predetermined shape and an area sized to fit loads of the high fan-out net within the region on the target integrated circuit;
    determining a delay of the high fan-out net based upon a distance from a center of the region to an edge of the region; and
    performing at least one of placement or routing using the delay of the high fan-out net for hardware implementation within the target integrated circuit.

9. The system of claim 8, wherein the area is a minimum area needed to place the loads of the high fan-out net.

10. The system of claim 8, wherein the predetermined shape is a rhombus and the edge is a farthest edge from the center.

11. The system of claim 8, wherein the area is determined according to a number of the loads of the high fan-out net and a size of the loads.

12. The system of claim 11, wherein the size of the loads is determined based upon a spacing between like loads of a same type on the target integrated circuit.

13. The system of claim 8, wherein the high fan-out net comprises a plurality of different types of loads and the processor is configured to initiate executable operations further comprising:

determining a region for each type of load of the high fan-out net and area for each region; and determining a delay of the high fan-out net for each type of load based upon a distance from a center of the region for the load type to an edge of the region for the load type.

14. The method of claim 8, wherein a pin for each load is a clock-enable pin.

15. A computer program product comprising a computer readable storage medium having program code stored thereon for designing a circuit, the program code executable by a processor to perform operations comprising:

within a circuit design, detecting a high fan-out net having loads with a same timing requirement, wherein the circuit design is technology specific for a target integrated circuit;

determining a region having a predetermined shape and an area sized to fit loads of the high fan-out net within the region on the target integrated circuit;

determining a delay of the high fan-out net based upon a distance from a center of the region to an edge of the region; and performing at least one of placement or routing using the delay of the high fan-out net for hardware implementation within the target integrated circuit.

16. The computer program product of claim 15, wherein the area is a minimum area needed to place the loads of the high fan-out net.

17. The computer program product of claim 15, wherein the predetermined shape is a rhombus and the edge is a farthest edge from the center.

18. The computer program product of claim 15, wherein the area is determined according to a number of the loads of the high fan-out net and a size of the loads.

19. The computer program product of claim 18, wherein the size of the loads is determined based upon a spacing between like loads of a same type on the target integrated circuit.

20. The computer program product of claim 15, wherein the high fan-out net comprises a plurality of different types of loads and the program code is executable by the processor to perform operations further comprising:

determining a region for each type of load of the high fan-out net and area for each region; and determining a delay of the high fan-out net for each type of load based upon a distance from a center of the region for the load type to an edge of the region for the load type.

* * * * *